United States Patent [19]

Di Lullo Arias

[11] Patent Number: 5,547,024
[45] Date of Patent: Aug. 20, 1996

[54] METHOD OF USING CONSTRUCTION GRADE CEMENT IN OIL AND GAS WELLS

[75] Inventor: Gino F. Di Lullo Arias, Singapore, Singapore

[73] Assignee: BJ Services Co, Houston, Tex.

[21] Appl. No.: 349,990

[22] Filed: Dec. 6, 1994

[51] Int. Cl.$^6$ ..................................................... E21B 33/13
[52] U.S. Cl. ............................................ 166/292; 106/714
[58] Field of Search ..................................... 166/292, 293; 106/714 X, 789, 790

[56] References Cited

U.S. PATENT DOCUMENTS

| | | | |
|---|---|---|---|
| 5,058,679 | 10/1991 | Hale et al. | 166/293 |
| 5,106,423 | 4/1992 | Clarke | 166/293 X |
| 5,125,455 | 6/1992 | Harris et al. | 166/292 |
| 5,213,160 | 5/1993 | Nahm et al. | 166/292 X |
| 5,305,831 | 4/1994 | Nahm | 166/292 X |
| 5,311,944 | 5/1994 | Cowan et al. | 166/292 |

OTHER PUBLICATIONS

Offshore South East Asia 10th Conference & Exhibition World Trade Centre, Singapore, Technical Paper No. 94021, A Sound Alternative For Oilwell Cementing, DiLullo et al., pp. 1–7, Dec. 6, 1994.

Smith, Dwight K., "The Manufacture, Chemistry and Classification of Oilwell Cements", *Cementing*, 1987, pp. 7–17.

*Primary Examiner*—George A. Suchfield
*Attorney, Agent, or Firm*—Arnold, White & Durkee

[57] ABSTRACT

A method of cementing an oil and gas wellbore is accomplished by mixing together blast furnace slag, construction grade cement and water to form a pumpable slurry. The slurry is then pumped to a selected location within an oil and gas well and allowed to solidify within the wellbore. The blast furnace slag alters the properties of the construction grade cement so that it can be used in the construction of oil and gas wells, where it would otherwise not be feasible to use. The blast furnace slag enhances the physical and chemical properties of the construction grade cement, increasing gel times and decreasing fluid loss.

20 Claims, 2 Drawing Sheets

Effect of CMAS % on Fluid Loss

Comparison between bentonite slurry and CMAS + bentonite slurry

Effect of CMAS % on Compressive Strength 5,547,024

1

METHOD OF USING CONSTRUCTION GRADE CEMENT IN OIL AND GAS WELLS

BACKGROUND OF THE INVENTION

1. Field of the Invention

This invention relates to a method of cementing an oil or gas well using construction grade cement.

2. Background Information

Cements are divided into various classes depending upon their chemical and physical properties and their application. For instance, the American Society for Testing and Materials (ASTM) divides cement into various types. The ASTM classes of cement range from Type I through Type V. In the oil and gas well construction industry, the American Petroleum Institute (API) has set standards for different classes of cement, similar to those established by the ASTM. The API has divided cements for use in oil and gas wells into eight different classes, classes A through H. Because stricter requirements are necessary for some cements to ensure proper performance of the cement and the cement slurry, it is necessary to have these different classes. Cement and cement slurries which are pumped downhole within oil and gas wells are subjected to various types of energy. This energy is mainly kinetic and thermodynamic energy having different intensities and duration levels which affect the cement's hydration rate, morphology and slurry properties.

Construction grade cement is commonly available from a variety of manufacturers and is very inexpensive compared to the higher grades of cement used in cementing oil and gas wells. While construction grade cement may be suitable for a large number of surface applications, they seldom meet the requirements established by the API for parameters such as thickening time, free water, compressive strength and chemical makeup. The composition of the construction grade cements also varies from manufacturer to manufacturer making it hard to predict the physical properties of the resulting cement and cement slurry. Thus, construction grade cements are seldom, if ever, used in downhole applications. This is particularly true when cementing intermediate and production casings of oil and gas wells.

Because construction grade cements are readily available and quite inexpensive, it would be advantageous to be able convert or utilize construction grade cement in oil and gas wells, particularly when cementing intermediate and production casings.

SUMMARY OF THE INVENTION

A method of cementing a wellbore of an oil and gas well is accomplished by forming an admixture of construction grade cement and granulated blast furnace slag, the admixture containing blast furnace slag in an amount between 10 and 200% by weight of the construction grade cement. Water is added to the admixture in a sufficient amount to form a pumpable slurry. The slurry is then pumped to a selected location in the wellbore and allowed to solidify.

2

Figure 3:
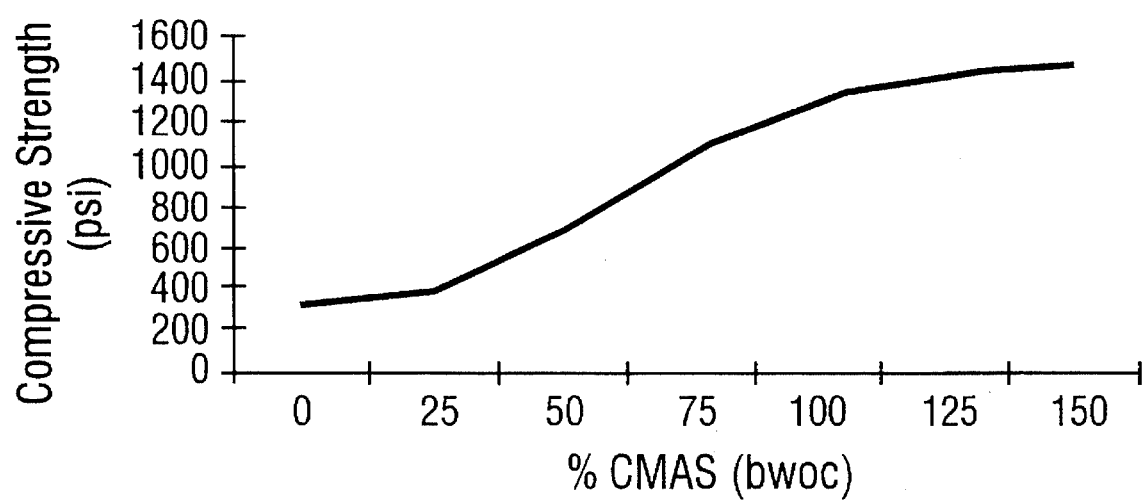

FIG. 3 is a graph showing the effect blast furnace slag has on the compressive strength of construction grade cement when used at different concentrations.

DESCRIPTION OF THE PREFERRED EMBODIMENT

Blast furnace slag is a combination of earthen materials which are formed as a byproduct in the smelting of iron ore. The earthen materials which form the blast furnace slag are initially melted together during the smelting process at extremely high temperatures, exceeding 2500° F. and are cooled rapidly to form a new multi-oxide vitreous material. After cooling, the raw materials are dewatered and ground to a fine particle size, thus forming the ground blast furnace slag. The blast furnace slag is of a low density and consists of calcium-magnesium aluminosilicates (CMAS) that have cementitious properties. Ground blast furnace slag or CMAS has been an additive used with cement in the past. Yet, to the applicant's knowledge, there has been no use of blast furnace slag with construction grade cements to convert them into a usable form for subsurface cementing operations of oil and gas wells.

As discussed previously, the ASTM and API have divided cements into different types or classes depending upon their chemical composition and physical properties. As used herein, construction grade cement refers to ordinary Portland cement (OPC) and those cements classified as Type I, II or III cement, as defined in ASTM Specification C150-89, a Annual Book of ASTM Standards, 1986, and those classes of cement established by API Spec 10A, 5th Edition, Jul. 1, 1990, which do not meet the requirements for Class G and H cement. In particular, it is the lower grades of cement, such as the ASTM Type I cements and the API class A, B and C cements, that are of primary concern.

Chemically, Type I, II and III ASTM cements and those API cements other than classes G and H, do not meet the requirements for tricalcium silicates and total alkali content. API Spec 10A, 5th Edition, Jul. 1, 1990, requires that class G and H cements have tricalcium silicate ($3CaO.SiO_2$) at a maximum level of 58% and a minimum of 48% for moderate sulfate resistant cements. For high sulfate resistant cements, tricalcium silicate must be between 48% and 65%. For both moderate and high sulfate resistant API type G and H cements, total alkali content, expressed as sodium oxide ($Na_2O$) equivalent, can be no more than 0.75%.

It is in terms of the physical properties of the cement and cement slurry, however, that are of primary interest in evaluating construction grade cements for use in oil and gas wells. Physically, the construction grade cements do not meet the requirements for thickening time and compressive strength necessary for use in oil well cementing operations at depths below 6000 feet. Specifically, a minimum compressive strength of 1500 psi after 8 hours of curing time and a thickening time of between 90 and 120 minutes at 125° F. (Schedule 5, API Spec. 10) are required for API class G and H cements. Class G and H must also have a free water content of no more than 1.4% by volume based on the total volume of slurry. Based upon these criteria, it was possible to evaluate various construction grade cements which would be suitable for use in cementing intermediate and production casings of oil and gas wells.

Ordinary Portland cement, which makes up most construction grade cements, is hydraulically active, i.e. it reacts with water. The hydration of Portland cement can be represented by the following formula:

(Eq. 1)

where, $CaSO_4$=gypsum; A=aluminates; CS=calcium silicate; H=water; C-S-H=calcium silicate hydrate; C-SA-H=calcium mono sulfo aluminate hydrate; and $Ca(OH)_2$=calcium hydroxide.

The hydration reaction results in a crystal development process where C-S-H fibrils grow like branches out of the cement particles, while hexagonal plates of calcium hydroxide (Portlandite) and needles of Ettringite are precipitated among the cement particles. In the early stages of hydration, gypsum reacts with tricalcium aluminate ($C_3A$) to form a coating of Ettringite which temporarily inhibits the hydration of fast reacting $C_3$ A. Meanwhile, a semi-permeable coating of C-S-H gel, temporarily inhibits the hydration of the dicalcium silicate ($C_2S$) and tricalcium silicate ($C_3$ S). After a dormant period, hydration proceeds to completion, producing C-S-H, C-SA-H, Portlandite and small amounts of unhydrated cement. As long as there is water available, the cement particles and their by products will react continuously until a solid mass is formed. The strength and durability of the cement paste and resulting set product depends largely on the water to cement ratio, porosity of hard set cement and to what extent the pores are interconnected, i.e. to what degree permeability is developed.

To a great extent, the cement slurry's gelation can be associated in great part to the formation of calcium hydroxide $Ca(OH)_2$ and its reaction with aluminates and sulfate compounds during cement hydration. Also, when cementing oil and gas wells, the slurries are submitted to different energy levels, both kinetic and thermodynamic and time intervals, which affect the hydration rates of the different components of the cement, their morphology and therefore the slurry properties.

Blast furnace slag or CMAS is also hydraulically active. CMAS hydration takes place immediately after mixing with water. During the hydration of CMAS, a semi-permeable coating is formed on particle surfaces, inhibiting water penetration and further dissolution. Calcium hydroxide ($Ca(OH)_2$), a by product during the hydration of ordinary Portland cement, accelerates the dissolution of Si and Al ions by breaking the Si—O and Al—O bonds in the CMAS surface structure. When the solution becomes oversaturated, precipitation of low solubility calcium silicate hydrate (C-S-$H^2$) and other hydrates occurs. This complex process continues in alternating stages throughout the hydration process. This two step process concluding in the hydration of CMAS can be represented by the following formula:

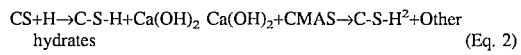
(Eq. 2)

The calcium silicate hydrate (C-S-$H^2$) produced by the hydration of CMAS differs in many ways from the calcium silicate hydrate (C-S-H) produced by Portland cement. The calcium silicate hydrate produced from CMAS has a high alkali content and more important a lower calcium/silicate (C:S) ratio, typically around 1 to 1. Ordinary Portland cement has a C:S ratio of around 3 to 1. In terms of physical properties, the calcium silicate hydrate produced by CMAS is harder and more dense that the C-S-H gels formed by Portland cement. Also, the morphology of hydrating CMAS is an incongruent mass development as opposed to fibril interlocking. This reduces the binding properties and limits the use of CMAS by itself as CMAS particles must be very close to each other in order to interlock properly. Neat CMAS set products, even when slurries are activated by alkaline salts, are brittle and have lower flexural strength than cement or CMAS/cement blends. Neat CMAS cements also shrink and crack with time due to slow hydration and poor interlocking.

Other major differences between CMAS and Portland cement hydration are timing and kinetics. Compared to Portland cement, CMAS is latently hydraulic, becoming more active with increases in temperature, mix water alkalinity and sulfate content, and decrease in surface tension. CMAS hydration produces only one fourth of the heat generated by Portland cement hydration thus reducing thermal stress on the annulus during the setting period and reducing the risk of creating a micro-annulus around the casing. The lower C:S ratio (1:1 versus 3:1) provides a second means of reducing calcium hydroxide by reducing the calcium oxide available to cause its precipitation. Table 1 shows different components of ordinary Portland cement and ordinarily Portland cement with 65% CMAS.

TABLE 1

| Element | OPC | CMAS:OPC 65:35 |
|---|---|---|
| CaO % | 62 | 51 |
| $SiO_2$ % | 22 | 29 |
| $Al_2O_3$ % | 4.3 | 9.5 |
| MgO % | 3.5 | 4.5 |
| $Fe_2O_3$ % | 3.9 | 1.7 |
| $SO_3$ % | 3.5 | 2.1 |
| Other | 0.8 | 2.2 |
| C:S Ratio | 3.0:1 | 1.8:1 |

As can be seen, a comparison of oxide mineral composition shows that the C:S ratio of OPC/CMAS blend approaches 1.8:1. This tends to stabilize the slurry at high temperatures by making it less reactive.

In order for CMAS to be useable in oil field applications, it must conform with ASTM specification ASTM-C-989, Annual Book of ASTM Standards, February 1983. Second, the blast furnace slag must also have a performance activity equivalent to grade 100 or superior without additional chemicals.

When CMAS and Portland cement blends are used to prepare slurries for primary cementing operations in oil and gas wells, they complement each other, producing not only excellent slurries but a set product which is superior in durability. In addition, when the amount of cement in the blend is less than one half that required to produce a cement slurry with equivalent density, the dissolution of cement by CMAS, commingled with its lower hydraulic activity and different hydration morphology, allows ordinary Portland cement or construction grade cement to be used in preparing slurries suitable for oil field cementing operations where API class G and H would otherwise be used. Intermediate and production casings can be cemented with these blends, thus reducing the cement costs for the well. When using CMAS with construction grade cement, typically, activators, such as sodium hydroxide (caustic) and soda ash can be mixed with the slag in order to accelerate the hydration reaction which causes the cement to set or harden. Other activators include sodium carbonate, calcium oxide, calcium hydroxide, magnesium hydroxide, magnesium oxide, sodium sulfate, calcium sulfate, calcium nitrate, calcium nitrite, zinc oxide, zinc carbonate, titanium carbonate and potassium hydroxide.

Other additives are also used and include retarders, dispersants, and viscosity reducers. Examples of retarders are lignin and sugar derivatives. Deflocuents or dispersants include lignosulfonates, naphthalene sulfonates, phenol sulfonates, phosphates, phosphonates, sulfonated styrene maleic anhydride, sulfonated sytrene, maleimide, polyacrylates and polymethacrylates. Viscosity reducers include organic acids.

When combined with construction grade cement, CMAS improves the properties of the slurry so that it can be used in oil well applications. CMAS/cement slurries exhibit better rheology. A lower plastic viscosity reduces friction pressure and lower gel strength reduces the pressure increase after shut downs. During transition from liquid to solid state, CMAS/construction cement blends prevent gas invasion and/or migration based on the principle of bridging and close packing. Fluid loss, free water and rheological properties of slurries are improved by the combination of construction grade cement and CMAS, as well as thickening or gel times. As a slurry, CMAS particles intermix with cement particles producing a dispersing action because of its higher negative zeta potential. This, combined with a pore volume reduction, improves slurry dispersion and enhances fluid loss control. The pore volume reduction is due to the smaller particle size of the CMAS particles and the reduction in calcium hydroxide. A reduction in calcium hydroxide also tends to stabilize polymer based fluid loss additives, making them more effective.

Figure 1:
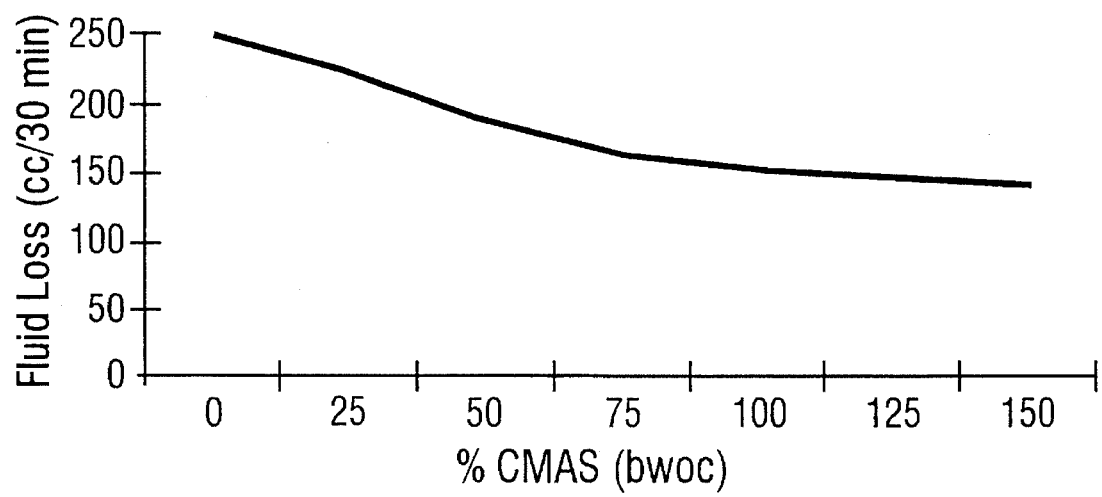
FIG. 1 is a graphical representation showing the effect blast furnace slag at varying concentrations has on fluid loss when used with construction grade cement.

The CMAS also helps to control free water of the slurry by absorbing water, which the Portland cement cannot, during wetting and hydration. FIG. 1 shows the effect of CMAS on fluid loss, with fluid loss decreasing as the concentration of CMAS is increased. Data obtained for the plot of FIG. 1 were obtained during tests conducted at 150° F. using ordinary Portland cement slurry having a specific gravity of 1.90 and containing a dispersant and PVAP in an amount of 3% by weight of water.

Figure 2:
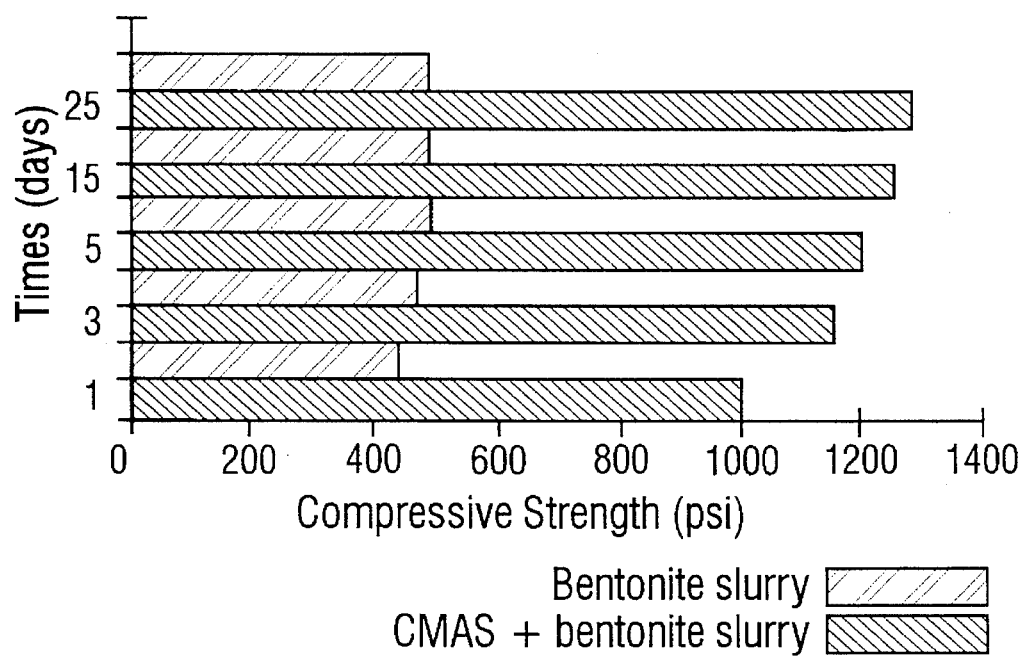
FIG. 2 is a graphical representation of the compressive strength of cements containing bentonite with and without blast furnace slag.

CMAS also improves the properties of the set cement. During hydration, approximately twenty pounds of portlandite is produced for one cubic foot of typical construction grade cement. Portlandite is a weak soluble material that does not contribute to cement compressive strength and can be leeched out by downhole fluids. CMAS consumes calcium hydroxide during its hydration and forms a high strength material, i.e. C-S-H$^2$ gel, thereby increasing compressive strength. This effect can be seen when comparing a CMAS slurry to a cement slurry extended with bentonite. Bentonite is used to lighten or reduce hydrostatic pressure on the annulus of cement slurries and to save costs by increasing slurry yield. FIG. 2 shows the comparison of an OPC slurry containing 2.5% bentonite versus a slurry with bentonite and 65% CMAS. Tests were conducted at 136° F. using a slurry having a specific gravity of 1.55. As can be seen from FIG. 2, the cement using 65% CMAS has a compressive strength of 1000 psi compared to 400 psi compressive strength for a slurry extended solely with bentonite. The compressive strength of the CMAS slurry continues to increase over time.

The compressive strength of ordinary Portland cement is also increased with increased concentration of CMAS. FIG. 3 shows that when CMAS is used with ordinary Portland cement at concentrations of between 50 to 100% based on weight of cement (bwoc), the compressive strength increases dramatically. Above 100% the compressive strength begins to level off. Critical concentrations for maximum strength benefit varies, depending mainly on slurry density. The cement used for FIG. 3 was an ordinary Portland cement slurry having a specific gravity of 1.55. Tests were conducted at a temperature of 200° F.

In order to evaluate the effect of CMAS on construction grade cements to improve their characteristics for use in place of API class G and H cements, tests were conducted using different commercially available construction grade cements. Specifically, SsangYong Cement, available from SsangYong Singapore, and PMC House Brand Cement, available from Pan Malaysia Cement Works (S) Pte Ltd., were evaluated. Table 2 shows the results of tests conducted using different cements and cement mixtures. PMC Class G Oilwell Cement, which is an API class G cement, was also used for comparison. PMC House Brand Cement and SsangYong Cement are both ordinary Portland cement mixtures. Both the PMC House Brand Cement and SsangYong Cement were also tested using 70% blast furnace slag (bwoc). Tests were carried out in accordance with API Spec. 10 procedures. The blast furnace slag used had a Blaine fineness of 4000 cm$^2$/g.

TABLE 2

|  | PMC Class G Oilwell Cement | PMC House Brand Cement (OPC) | Ssang Yong Cement (OPC) | PMC House Brand Cement (OPC) with 70% Blast Furnace Slag | Ssang Yong Cement (OPC) with 70% Blast Furnace Slag |
|---|---|---|---|---|---|
| Density (ppg) | 15.9 | 15.9 | 15.9 | 15.9 | 15.9 |
| Mix water | Deionized water | Deionized water | Deionized water | Deionized water | Deionized water |
| Free water at 80° F. (%) | 0.96 | 0 | 0 | 0 | 0 |
| 8 Hrs Compressive strength at 140° F. (PSI) | 1628 | 1378 | 1300 | 1610 | 1600 |
| Thickening time at 125° F. API schedule 5 g | MINS | MINS | MINS | MINS | MINS |
| FIRST TEST (100 Bc) | 101 | 76 | 81 | 95 | 100 |
| SECOND TEST (100 Bc) | 107 | 82 | 84 | 97 | 101 |

API Specification:
Free water: 1.4% (max)
Compressive strength 8 hrs: 1500 psi (min)
Thickening time at API schedule 5 (125° F.) 90–120 mins As can be seen from the results set forth in Table 2, the PMC House Brand Cement and SsangYong Cement, which did not contain blast furnace slag, did not meet the criteria for compressive strength and thickening time.

In order to convert construction grade cements that do not ordinarily meet class G and class H criteria, they must be combined with between 10–200% of CMAS or blast furnace slag (bwoc), with 25–150% CMAS (bwoc) being preferred, and still more preferably, between 45–75% CMAS (bwoc). Water in an amount ranging between 30% to 150% (bwoc)

is typically required to bring the cement slurry to the proper consistency. The amount of blast furnace slag or CMAS depends on the desired slurry density for the specific application and requirements such as compressive strength, fluid loss control and gas control properties. The actual amount of blast furnace slag required for different brands of construction grade cement may also vary and should be determined by lab testing prior to the cementing job. Blast furnace slag having a fineness of at least 4000 cm$^2$/g should be used with slag having a fineness greater than about 7000 cm$^2$/g being preferable, more preferably greater than about 10,000 cm$^2$/g, and still more preferably greater than about 13,000 cm$^2$/g. Blast furnace slag having a fineness ranging between about 4000 cm$^2$/g to 6000 cm$^2$/g has been found to achieve satisfactory results. Conventional fluid loss additives, dispersants and viscosity reducers may be added to the CMAS/construction grade cement blends.

Once the CMAS/construction grade cement has been formulated into a pumpable slurry, it is pumped into the desired location within the wellbore. The CMAS/cement blend of the invention has particular application in cementing wells at a depth below 6000 feet where API class G and H cements are typically used. Cementing is usually accomplished by pumping the slurry down through the well casing. A separate fluid is then pumped into the casing after this so that the cement slurry is forced or squeezed out of the bottom of the casing and back up through the annulus or space between the exterior of the well casing and the borehole to the desired location. The CMAS/construction grade cement slurry is then allowed to solidify in situ.

The method of the invention has several advantages in that ordinary construction grade cement can be converted for use in oil and gas well construction in place of class G and H cements, which are typically for use at depths over 6000 feet. Blast furnace slag alters the construction grade cement's chemical and physical properties so that the compressive strength and thickening times are improved to meet API standards. Construction grade cements could not otherwise be used because of their unpredictability from brand to brand and their failure to meet these standards. The lower expense of the construction grade cement decreases the cost of cementing operations in oil and gas wells.

While the invention has been shown in only some of its forms, it should be apparent to those skilled in the art that it is not so limited but is susceptible to various changes without departing from the scope of the invention.

I claim:

1. A method of cementing a wellbore of an oil or gas well comprising the steps of:

forming a pumpable slurry which includes water and a cementitious component, the cementitious component consisting essentially of a blend of construction grade cement and granulated blast furnace slag;

pumping the slurry to a selected location within the wellbore; and then allowing the slurry to solidify within the wellbore.

2. The method of claim 1, wherein:

the amount of blast furnace slag is between about 10 to 200% by weight of the construction grade cement.

3. The method of claim 1, wherein:

the amount of blast furnace slag is between about 25 to 150% by weight of the construction grade cement.

4. The method of claim 1, wherein:

the amount of blast furnace slag is between about 45 to 75% by weight of the construction grade cement.

5. The method of claim 1, wherein:

the blast furnace slag has a Blaine fineness of at least 4000 cm$^2$/g.

6. The method of claim 1, wherein:

the step of pumping the slurry includes pumping the slurry to a depth below 6000 feet.

7. The method of claim 1, wherein:

an accelerator is also mixed with the blast furnace slag, construction grade cement and water.

8. The method of claim 1, wherein:

the construction grade cement is selected from a group consisting of Type I, II and III ASTM cements and API Class A–F cements.

9. A method of cementing a wellbore of an oil or gas well comprising the steps of:

forming a pumpable slurry which includes water and a cementitious component consisting essentially of a blend of construction grade cement and granulated blast furnace slag, the granulated blast furnace slag being present in an amount between 10 and 200% by weight of the construction grade cement;

pumping the slurry to a selected location within the wellbore at a depth below 6000 feet; and then allowing the slurry to solidify within the wellbore.

10. The method of claim 9, wherein:

the amount of blast furnace slag is between about 10 to 200% by weight of the construction grade cement.

11. The method of claim 9, wherein:

the amount of blast furnace slag is between about 25 to 150% by weight of the construction grade cement.

12. The method of claim 9, wherein:

the amount of blast furnace slag is between about 45 to 75% by weight of the construction grade cement.

13. The method of claim 9, wherein:

the blast furnace slag has a fineness of at least 4000 cm$^2$/g.

14. The method of claim 9 wherein:

an accelerator is also mixed with the blast furnace slag, construction grade cement and water.

15. The method of claim 9, wherein:

the construction grade cement is selected from a group consisting of Type I, II and III ASTM cements and API Class A–F cements.

16. A method of cementing a wellbore of an oil or gas well comprising the steps of:

forming a pumpable slurry which includes water and a cementitious component, the cementitious component consisting essentially of a blend of construction grade cement and granulated blast furnace slag having a fineness of at least 4000 cm$^2$/g, the granulated blast furnace slag being present in an amount between 10 and 200% by weight of the construction grade cement, the construction grade cement being selected from a group consisting of Type I, II and III ASTM cements and API Class A–F cements;

pumping the slurry to a selected location within the wellbore at a depth below 6000 feet; and then allowing the slurry to solidify within the wellbore.

17. The method of claim 16, wherein:

the amount of blast furnace slag is between about 10 to 200% by weight of the construction grade cement.

18. The method of claim 16, wherein:

the amount of blast furnace slag is between about 25 to 150% by weight of the construction grade cement.

19. The method of claim 16, wherein:

the amount of blast furnace slag is between about 45 to 75% by weight of the construction grade cement.

20. The method of claim 16, wherein:

an accelerator is also mixed with the blast furnace slag, construction grade cement and water.

* * * * *

UNITED STATES PATENT AND TRADEMARK OFFICE
CERTIFICATE OF CORRECTION

PATENT NO. : 5,547,024
DATED : August 20, 1996
INVENTOR(S) : Gino F. Di Lullo Arias It is certified that error appears in the above-identified patent and that said Letters Patent is hereby corrected as shown below:

column 1, line 45, before the word "convert" add --to--.

column 2, line 30, before the word "Annual" delete the word "a".

column 2, line 40, "(3CaO.SiO2)" should be --(3CaO•$SiO_2$)--.

column 3, line 13, after "$C_3$" delete the space; it should be --$C_3A$--.

column 3, line 15, after "$C_3$" delete the space; it should be --$C_3S$--.

column 3, line 60, "that" should be --than--.

column 3, line 66, "slurties" should be --slurries--.

Signed and Sealed this

Twenty-ninth Day of July, 1997

*Attest:*

BRUCE LEHMAN

*Attesting Officer*     *Commissioner of Patents and Trademarks*